No. 824,844. PATENTED JULY 3, 1906.
A. W. CARPENTER.
ELASTIC TIRE.
APPLICATION FILED NOV. 27, 1905.

Witnesses:
J. K. Moore
G. H. Hubbard

Inventor:
Alfred W. Carpenter.
by Whitaker Prevost
attys.

UNITED STATES PATENT OFFICE.

ALFRED WILLIAM CARPENTER, OF LONDON, ENGLAND.

ELASTIC TIRE.

No. 824,844.

Specification of Letters Patent.

Patented July 3, 1906.

Application filed November 27, 1905. Serial No. 289,294.

*To all whom it may concern:*

Be it known that I, ALFRED WILLIAM CARPENTER, a subject of the King of Great Britain, residing at 28 Bedford street, Strand, London, England, have invented new and useful Improvements in Elastic Tires for Vehicle-Wheels, of which the following is a specification.

My invention relates to improvements in elastic tires for vehicle-wheels, and has for its object to provide a solid tire which possesses a high degree of resiliency.

According to my invention I provide a tire the resilient body of which is composed of thin cords of elastic material, such as india-rubber, the said cords being wound in layers, so as to provide a cylindrical body. In practice the elastic cord is preferably wound upon a core of a suitable material, such as hard rubber, and the cylindrical body formed is inclosed in an outer cover fitted in the wheel-rim in any convenient way.

To enable the invention to be fully understood, I will describe it by reference to the accompanying drawings, in which—

Figure 1:
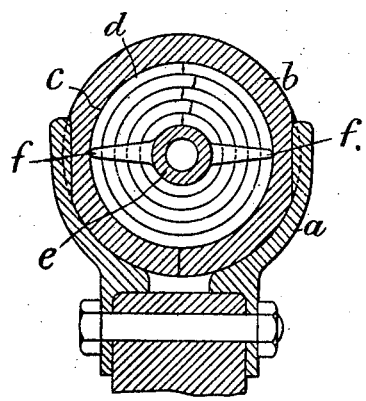
Figure 2:
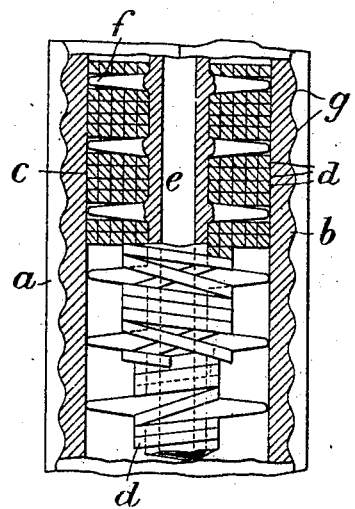

Figure 1 is a transverse section of an elastic tire made according to the invention and shown in position upon a wheel-rim, and Fig. 2 is a horizontal section of a portion of the tire.

*a* represents the rim of the wheel, and *b* is the outer cover of the tire, both these parts being of ordinary construction.

*c* is the resilient body of the tire, the said body being formed of india-rubber cords *d*, which are wound spirally and preferably in tension in layers around the central core *e*, the successive layers being coiled in different directions or at different angles to obtain the best results. The central core *e* is formed with a number of lateral spike-shaped projections *f*, which intersect the coils of the elastic cords *d*. The object of these projections is to prevent the elastic body from shifting or creeping relatively with the core when the tire is in use.

To prevent the tire as a whole from creeping in the rim *a*, the latter is formed in the known way with internal corrugations *g*, and the outer cover *b* is made to fit into these corrugations.

My improved tire is specially suitable for motor road-vehicles of all descriptions, as it possesses resiliency and cannot creep, and, as it is solid, is not subject to the disadvantages of puncturing common to pneumatic tires.

Having now particularly described and ascertained the nature of my said invention and in what manner the same is to be performed, I declare that what I claim is—

1. A tire for vehicle-wheels having a resilient body composed of layers of coiled elastic cord, substantially as hereinbefore described.

2. In a tire of the kind described, the combination with a core, of resilient cord wound around said core and a covering for said core and resilient cord, substantially as described.

3. In a tire of the kind described, the combination with a core, of a series of layers of resilient cord wound around said core and completely incasing the same and a covering for said resilient cord and said core, substantially as described.

4. In a tire of the kind described, the combination with a core, of a series of layers of resilient cord wound spirally around said core, the cord of adjacent layers being wound in the opposite direction and a covering for said resilient cord and said core, substantially as described.

5. An elastic tire for vehicle-wheels comprising an outer cover and a resilient body composed of layers of elastic cord wound spirally upon a core provided with lateral projections, substantially as hereinbefore described.

6. In a tire of the kind described, the combination with a core provided with lateral projections, of a series of layers of resilient cord wound spirally around said core, the cord of adjacent layers being wound in the opposite direction and a covering for said core and resilient cord, substantially as described.

ALFRED WILLIAM CARPENTER.

Witnesses
JAMES LINDSAY,
A. ALBUTT.